(12) United States Patent
Kim et al.

(10) Patent No.: US 6,253,267 B1
(45) Date of Patent: Jun. 26, 2001

(54) HOT-PLUG OF PCI BUS USING SINGLE CHIP

(75) Inventors: Hyung-Sun Kim; In-Ho Lee, both of Seoul; Ho-Kyu Son, Suwon; Myung-Jae Gil, Seoul; Myung-Woo Lee, Seoul; Seung-Wha Yoo, Seoul, all of (KR)

(73) Assignee: SamSung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/126,601

(22) Filed: Jul. 31, 1998

(30) Foreign Application Priority Data

Jul. 31, 1997 (KR) .................................................. 97-36523

(51) Int. Cl.[7] .................................................. G06F 13/00
(52) U.S. Cl. .................................................. 710/103
(58) Field of Search .................... 710/103, 102, 710/101; 713/300; 700/22, 286

(56) References Cited

U.S. PATENT DOCUMENTS

| 5,272,584 | | 12/1993 | Austruy et al. . | |
|---|---|---|---|---|
| 5,654,859 | * | 8/1997 | Shi | 361/66 |
| 5,703,769 | * | 12/1997 | Murray | 363/50 |
| 5,712,754 | | 1/1998 | Sides et al. . | |
| 5,781,744 | * | 7/1998 | Johnson et al. | 395/283 |
| 5,784,576 | * | 7/1998 | Guthrie et al. | 395/283 |
| 5,809,256 | * | 9/1998 | Najemy | 395/283 |
| 5,815,647 | * | 9/1998 | Buckland et al. | 395/182.01 |
| 5,875,308 | * | 2/1999 | Egan et al. | 710/103 |
| 5,875,310 | * | 2/1999 | Buckland et al. | 395/306 |
| 5,887,144 | * | 3/1999 | Gunthrie et al. | 395/281 |
| 5,909,559 | * | 6/1999 | So | 710/127 |
| 5,930,496 | * | 7/1999 | MacLaren et al. | 439/55 |
| 6,026,458 | * | 2/2000 | Rasums | 710/103 |
| 6,065,124 | * | 5/2000 | Lee | 713/323 |

OTHER PUBLICATIONS

"Deploying PCI Hot Plug on Compaq Servers in a Microsoft Windows NT Environment", *White Paper*, Compaq, Jul. 1997.
"PCI Hot Plug Technology With SCO Software Architecture", *Technology Brief*, Compaq, Sep. 1997.
"File Server Solutions PCI Hot Plug HIP1011", *Technical Manual*, Harris, Apr. 1998.
"SN74CBT16211 24 Bit Bus Switch", *Technical Manual*, Texas Instruments, Jul. 1995.
"High–Speed CMOS 10–Bit Bus Switches", *QuickSwitch Products*, Quality Semiconductor, Inc., Jul. 1997.
"PCI Hot Plug Technology With Novell Architecture", *Novell Manual*, Novell, Inc., 1998.
"PCI Hot–Plug Technology", *Technology Brief*, Compaq, Nov. 1996.
"Improving Your HIP 1011 Hot Plug Design", *Tech Brief*, Harris, Apr. 1998.

* cited by examiner

*Primary Examiner*—Robert Beausoleil
*Assistant Examiner*—X. Chung-Trans
(74) *Attorney, Agent, or Firm*—Robert E. Bushnell, Esq.

(57) ABSTRACT

A hot-plug controller of PCI (Peripheral Components Interconnects) bus using single chip is disclosed. A PCI hot-plug controller using FPGA and ASIC implements all functions necessary for the PCI hot-plug on a single chip, the PCI hot-plug controller includes: System Interface Unit transmitting data via PCI, USB and I2C bus; Register Unit, which is connected to the System Interface Unit, and receives reset control signal, Present Detection signal, Enable signal, LED control signal and physical ID signal from the outside, and stores the signals; Power Control Unit reading data from the Register Unit and outputting signal to control the system power and slot power; and Bus Isolation Unit reading the control signal from the Register Unit and making the signal-line between PCI bus signal and PCI slot ON/OFF.

20 Claims, 3 Drawing Sheets

HOT-PLUG OF PCI BUS USING SINGLE CHIP

CLAIM OF PRIORITY

This application makes reference to, incorporates the same herein, and claims all benefits accruing, under 35 U.S.C §119 from an application entitled A Hot-Plug Of PCI Bus Using Single Chip earlier filed in the Korean Industrial Property Office on Jul. 31, 1997, and there duly assigned Serial No. 97-36523 by that Office.

1. Field of the Invention

The present invention relates to a hot-plug controller of a PCI (Peripheral Component Interconnect) bus using a single chip, and more particularly, to a method for implementing all functions necessary for the PCI hot-plug on a single chip.

2. Description of the Related Art

A prior method for implementing the PCI hot-plug needs the functions of: controlling power ON/OFF for each PCI slot; controlling independently to RST# of each PCI slot; controlling independently to attention indicator of each PCI slot; monitoring the equipment of an adapter card for each PCI slot; confining the performance of 66 Mhz for the main PCI bus and slot; performing the physical identification for each PCI slot; supplying only the present slot with power (not shutting off the present slot); interfacing with PCI, USB and I2C busses; and isolating a signal of each PCI slot.

The apparatus for power on-off is known to include Harris Semiconductor's HIP 1011 and Motorola's MC33XXX. And a signal isolation device has 24-bits, and three 32-bit PCI buses are needed per slot. Also, a controller is needed to control all the data as 32-bits plus a control bit or more by interfacing with the system.

A problem of the prior art is that at least five devices are needed. In addition, the prior art has problems such as available area on a printed circuit board, high costs, low reliability, etc.

In general, when a fault occurs in the computer peripheral devices, it is settled while the power is off for the whole system. And the system-down time contributes to a great cost and is an inconvenience to a computer-user. For solving the problems, a large number of vendors have given out the methods for a PCI Hot-Plug Specification. However, for implementing various functions, a lot of discrete components have been needed.

Examples of known devices for enabling hot plugging are found in U.S. Pat. No. 5,781,744 to Mary B. Johnson et al. entitled Method And Apparattus For Ensuring Safe Peripheral Connection; U.S. Pat. No. 5,712,754 to Chi Kim Sides et al. entitled Hot Plug Protection System; and U.S. Pat. No. 5,272,584 to Pierre Austruy et al. entitled Hot-Plugging Circuit For The Interconnection Of Cards To Boards.

SUMMARY OF THE INVENTION

For solving the prior art problems, the present invention is intended to provide a hot-plug controller of a PCI (Peripheral Components Interconnects) bus using a single chip, and more specifically, to provide a method for designing the controller of a PCI hot-plug to reduce the costs and increase reliability by implementing all functions for the PCI hot-plug on a single chip. Hereafter, "single chip" means one of a Field Programmable Gate-Array (FPGA), Application Specific Integrated Circuit (ASIC), and Hybride circuit.

A PCI hot-plug controller using FPGA and ASIC implements all functions necessary for the PCI hot-plug on a single chip, the PCI hot-plug controller includes: a system interface unit transmitting data via a PCI, USB and I2C bus; a register unit, which is connected to the system interface unit, and receives a reset control signal, a present detection signal, enable signal, LED (light emitting diode) control signal and physical identification (ID) signal from the outside, and stores the signals; a power control unit reading data from the register unit and outputting a signal to control the system power and slot power; and a bus isolation unit reading the control signal from the register unit and making the signal-line between the PCI bus signal and PCI slot ON/OFF.

The present invention provides design technology to reduce costs and increase reliability by implementing the above-mentioned functions on single chip.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
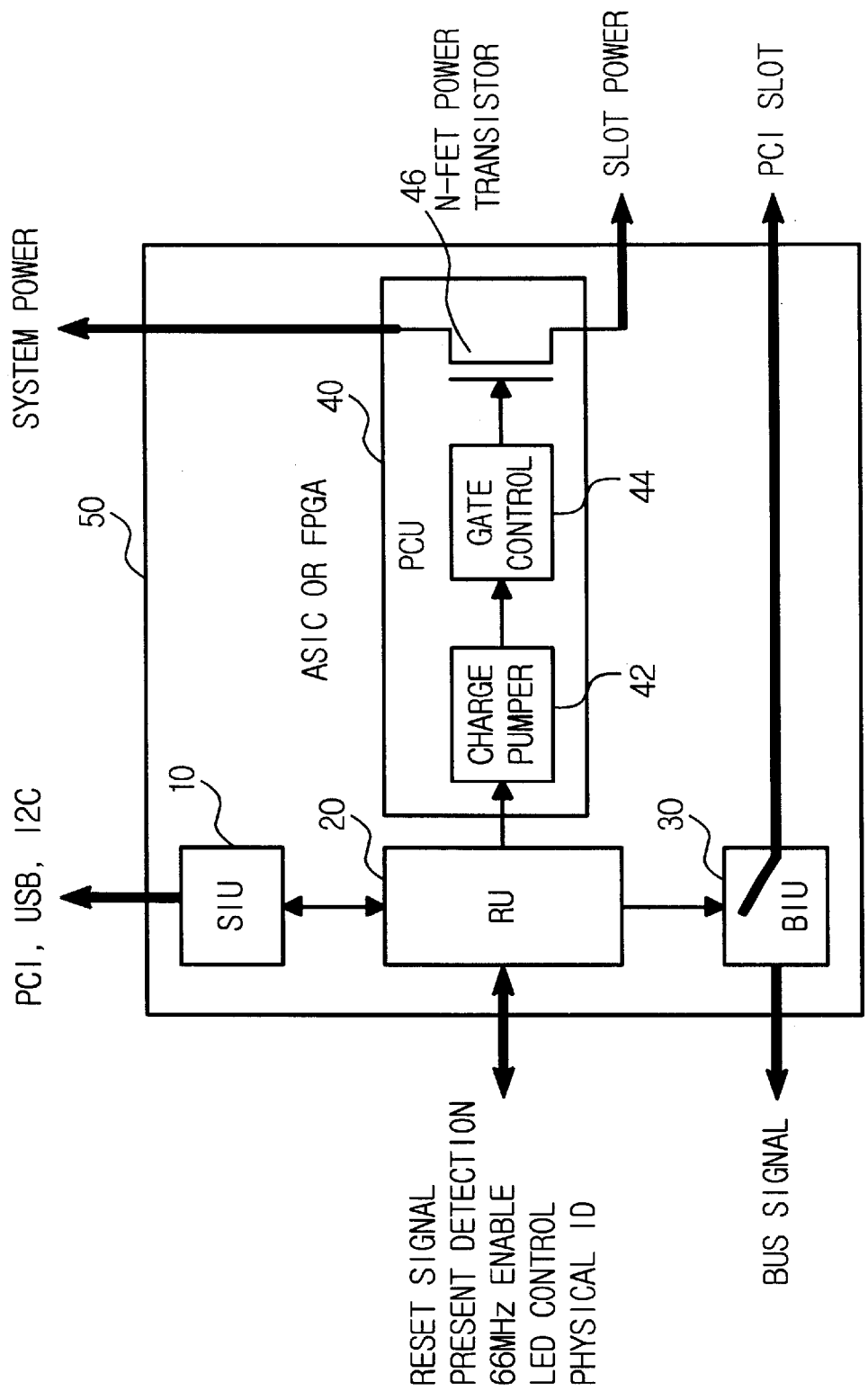
FIG. 1 illustrates one embodiment of a controller of a PCI hot-plug according to the present invention.

The first embodiment of the present invention, shown in FIG. 1, is a controller of a PCI hot-plug using a single chip FPGA or ASIC circuit 50 such that the controller utilizes: a system interface unit 10 transmitting data via a PCI, USB and I2C bus; a register unit 20, which is connected to the system interface unit 10, and receives a reset control signal, present detection signal, enable signal, LED control signal and physical ID signal from the outside and stores the signals; power control unit 40 reading data from the register unit 20 and outputting a signal to control the system power and slot power; and a bus isolation unit 30 reading the control signal from the register unit 20 and making the signal-line between the PCI bus and PCI slot ON/OFF.

Figure 2:
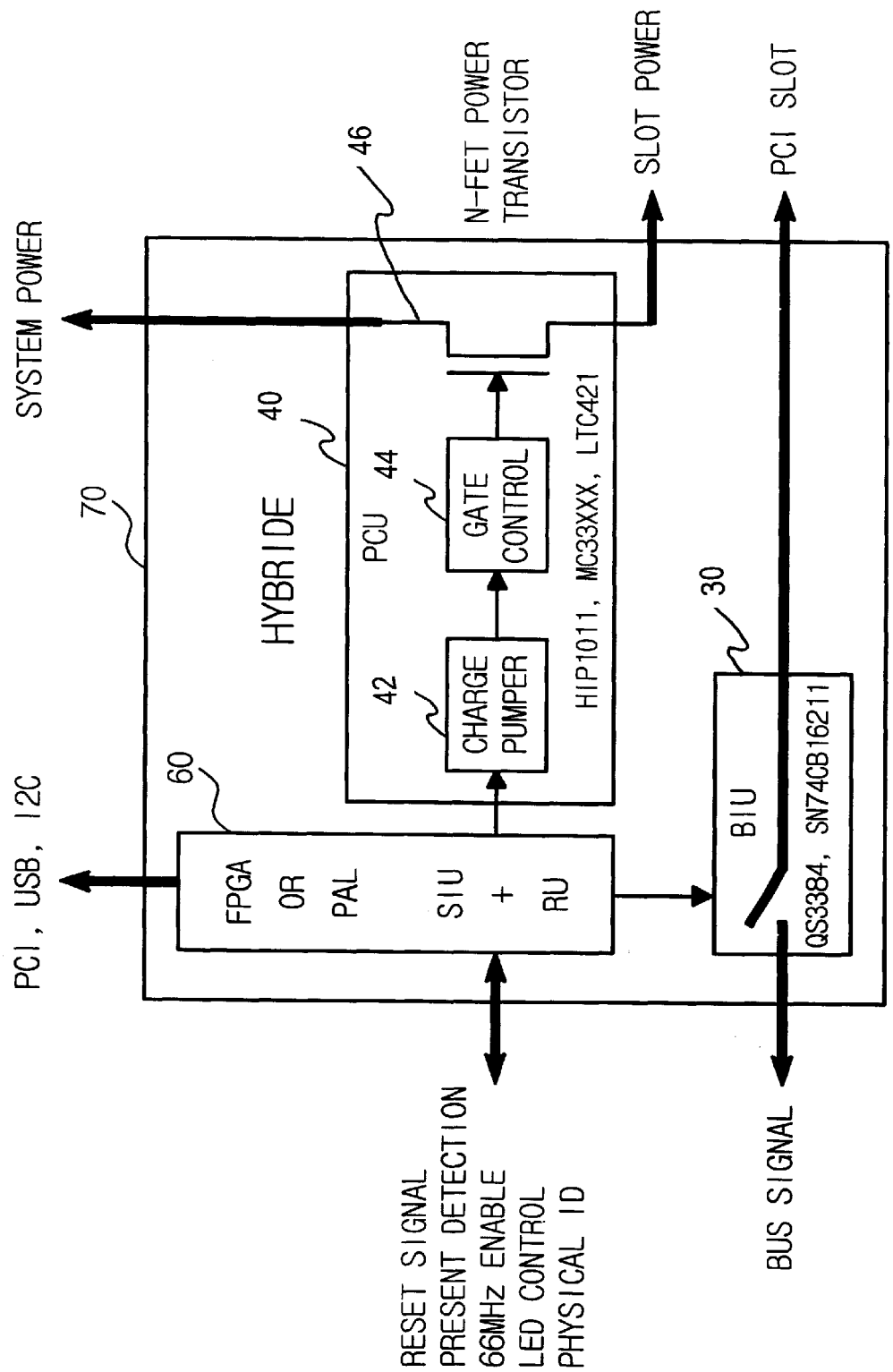
FIG. 2 illustrates another embodiment of a controller of a PCI hot-plug according to the present invention.

The second embodiment of the present invention, shown in FIG. 2, is a controller of a PCI hot-plug using a Hybride multi-chip circuit 70 made on a hybrid oxidized aluminum ($Al_2O_3$) board such that the controller utilizes: a FPGA or PAL (programmable array logic) circuit 60 transmitting data via PCI, USB and I2C bus, and which is connected to receive a reset control signal, a present detection signal, an enable signal, a LED control signal and a physical ID signal from the outside and storing them; a power control unit 40 reading data from the register unit 20 and outputting a signal to control the system power and slot power; and a bus isolation unit 30 reading the control signal from the register unit 20 and making the signal-line between the PCI bus and PCI slot ON/OFF.

The Hybride circuit 70 is easily designed because it can be equipped to a substrate by purchasing a silicon chip from a chip-vendor. The FPGA or PAL circuit 60 includes system interface unit 10 and register unit 20 such that the functions of the system interface unit 10 and register unit 20 are combined from off-the-shelf products. A Harris HIP1011 and a Motorola MC33XXX, can be used for the power control unit 40. A high speed CMOS 10-bit bus switch QS3384 by Quality Semiconductor, Inc. and a 24-bit bus switch SN74CB16211 by Texas Instruments can be used for the bus iIsolation unit 30.

Figure 3:
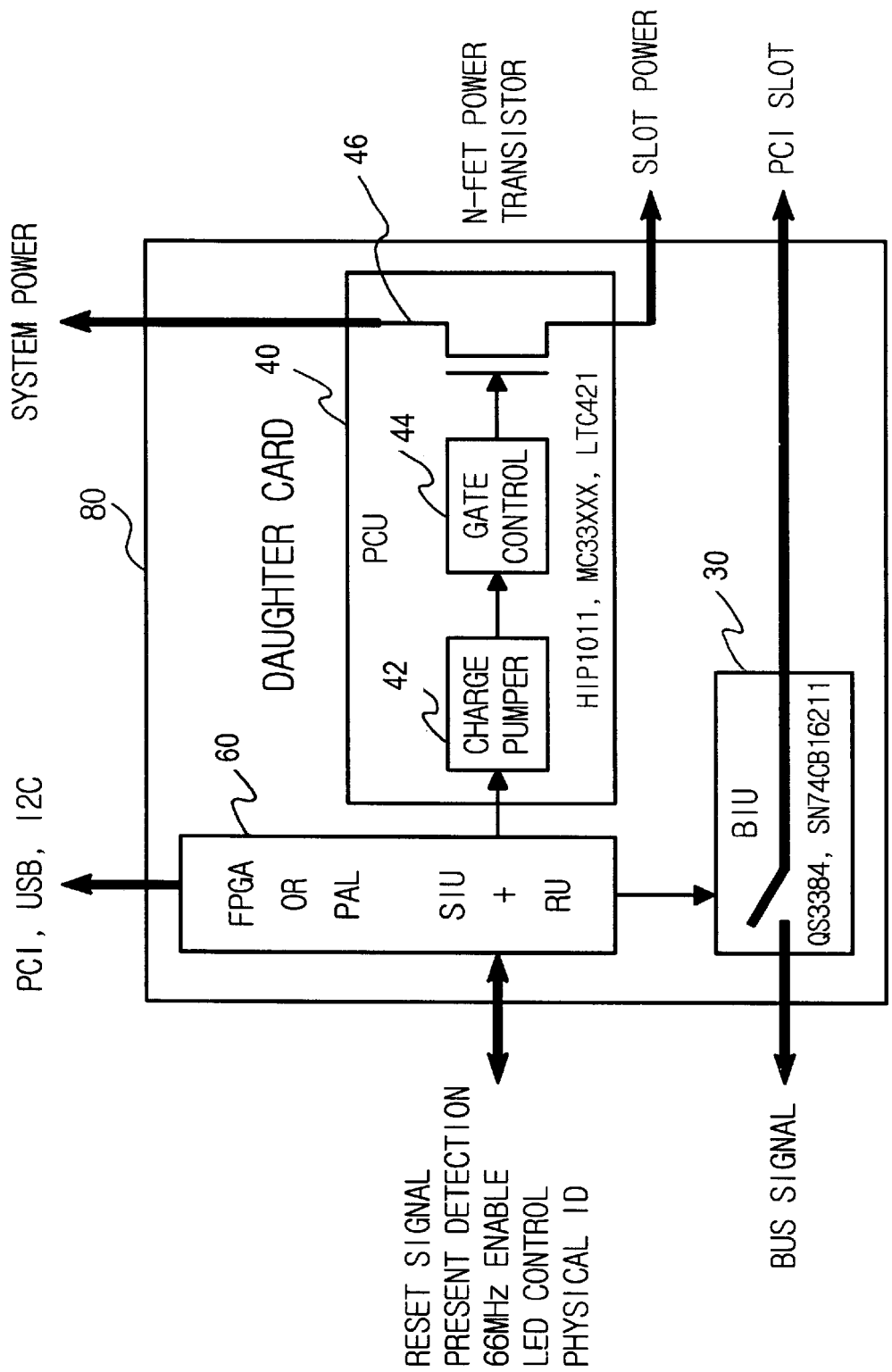
FIG. 3 illustrates yet another embodiment of a controller of a PCI hot-plug according to the present invention.

The third embodiment of the present invention, shown in FIG. 3, is a controller of PCI hot-plug using daughter card (a card equipped with modules) 80 such that the controller includes: a FPGA or PAL circuit 60 transmitting data via PCI, USB and I2C bus, and which is connected to receive a reset control signal, a present detection signal, an enable signal, a LED control signal and a physical ID signal from the outside and storing them; a power control unit 40 reading data from the register unit 20 and outputting a signal to control the system power and slot power; and a bus isolation unit 30 reading the control signal from the register unit 20 and making the signal-line between PCI bus and PCI slot ON/OFF.

The daughter card 80 is easily designed because it can be equipped to a card by purchasing a module from a chip-vendor. The FPGA or PAL circuit 60 includes system interface unit 10 and register unit 20 such that the functions of the system interface unit 10 and register unit 20 are combined from off-the-shelf products. A Harris HIP1011 and a Motorola MC33XXX can be used for the power control unit 40. A high speed CMOS 10-bit bus switch QS3384 by Quality Semiconductor, Inc. and a 24-bit bus switch SN74CB 16211 by Texas Instruments can be used for the bus iIsolation unit 30.

With respect to the foregoing embodiments, system interface unit 10 transmits commands to the system and receives the report of system status using PCI, USB and I2C. The PCI bus needs an address decode unit and the USB and I2C busses need means to convert the serial data to parallel data. The USB and I2C busses also need an interface circuit, as the logic swing is different from each other. The register unit 20 is a register bundle such that it registers information received from a USI (a register which temporarily stores the registration information of the internal PAL+FDGA from a processor) or an agent (an interface unit with PCI, USB and I2C). The power control unit 40 makes the power of the PCI slot ON/OFF. On the command transmitted from the register unit 20, charge pumper 42 turns on N-channel MOSFET 46. As the gate voltage of power the N-channel MOSFET 46 is twice or more as high as the source (system power), the slot power has the same voltage level as the system power. As the power N-channel MOSFET 46 occupies the silicon in a large amount, a separate discrete component can be used. The bus isolation unit 30 receives a command from register unit 20 and makes N-channel MOSFET 46 ON/OFF to connect the bus with separating from main PCI.

As stated above, the present invention has effect in that the number of components is reduced, the cost is cut down, easy to use, easy to lay out the printed circuit board and increase the system-reliability. While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A peripheral component interconnect (PCI) hot-plug controller implementing all functions necessary for a PCI hot-plug on a single chip, said PCI hot-plug controller comprises:

a system interface unit transmitting data via PCI, USB and I2C busses;

a register unit, which is connected to said system interface unit, and receives a reset control signal, a present detection signal, an enable signal, a LED control signal and a physical ID signal from the outside, and stores the signals;

a power control unit reading data from said register unit and outputting a signal to control the system power and slot power, wherein said power control unit comprises:
a charge pumper reading data from said resister unit;
a gate controller reading data from said charge pumper and outputting a control signal; and
a N-channel MOSFET power transistor that outputs a signal to control the system power and slot power in response to said control signal; and a bus isolation unit reading the control signal from said register unit and making the signal-line between a PCI bus signal and a PCI slot ON/OFF.

2. An apparatus as set forth in claim 1, wherein said functions necessary for the PCI hot-plug comprise:

a function controlling power ON/OFF for each PCI slot;

a function controlling independently to RST# of each PCI slot;

a function controlling independently to attention indicator of each PCI slot;

a function monitoring the equipment of adapter card for each PCI slot;

a function confirming the performance of 66 Mhz for Main PCI bus and slot;

a function performing the physical ID for each PCI slot;

a function supplying only present slot with power;

a function interfacing with PCI, USB and I2C bus; and a function isolating signal of each PCI slot.

3. An apparatus as set forth in claim 2, wherein said chip is one among FPGA, ASIC and Hybride.

4. An apparatus as set forth in claim 3, wherein in case that said chip is FPGA or ASIC, the specification for designing PCI hot-plug comprises:

a system interface unit for PCI bus, USB and I2C;

a register unit for storing information;

a power control unit for ON/OFF of power transistor; and a bus isolation unit for separating signal from the PCI bus.

5. An apparatus as set forth in claim 3, wherein in case that said chip is Hybride circuit, the specification for designing PCI hot-plug comprises:

a system interface unit for PCI bus, USB and I2C;

a register unit for storing information;

a power control unit for ON/OFF of power transistor; and a bus isolation unit for separating signal from the PCI bus.

6. An apparatus as set forth in claim 5, wherein said system interface unit and register unit are FPGA or PAL such that two functions are combined from off-shelve product.

7. An apparatus as set forth in claim 5, wherein said power control unit is one among a Harris Semiconductor HIP1011 and a Motorola MC33XXX.

8. An apparatus as set forth in claim 5, wherein said bus isolation unit is one among a high-speed CMOS 10-bit bus switch and a 24-bit bus switch.

9. An apparatus as set forth in claim 8, wherein said a high-speed CMOS 10-bit bus switch is a QS3384 switch by Quality Semiconductor, Inc. and said 24-bit bus switch is a SN74CBT 16211 switch by Texas Instruments.

10. An apparatus as set forth in claim 2, wherein in case that said chip is daughter card, the specification for designing PCI hot-plug comprises:

a system interface unit for PCI bus, USB and I2C;

a register unit for storing information;

a power control unit for ON/OFF of power transistor; and a bus isolation unit for separating signal from the PCI bus.

11. An apparatus as set forth in claim 10, wherein said system interface unit and register unit are FPGA such that two functions are combined from off-shelve product.

12. An apparatus as set forth in claim 10, wherein said power control unit is one among a Harris Semiconductor HIP1011 and a Motorola MC33XXX.

13. An apparatus as set forth in claim 10, wherein said bus isolation unit is one among a high-speed CMOS 10-bit bus switch and a 24-bit bus switch.

14. An apparatus as set forth in claim 13, wherein said a high-speed CMOS 10-bit bus switch is a QS3384 switch by Quality Semiconductor, Inc. and said 24-bit bus switch is a SN74CBT 16211 switch by Texas Instruments.

15. An apparatus as set forth in claim 10, wherein said system interface unit is characterized in that the system transmits commands and receives the report of status using PCI, USB and I2C.

16. An apparatus as set forth in claim 15, wherein said USB and I2C convert serial data to parallel data.

17. An apparatus as set forth in claim 15, wherein said USB and I2C comprise interface circuit.

18. An apparatus as set forth in claim 10, wherein said PCI bus comprises address decode unit.

19. An apparatus as set forth in claim 10, wherein said power control unit makes the power of PCI slot ON/OFF.

20. An apparatus as set forth in claim 10, wherein said bus isolation unit receives command from register unit and makes a N-channel MOSFET ON/OFF to connect the bus with separating from main PCI.

* * * * *